United States Patent [19]

House

[11] 4,283,813
[45] Aug. 18, 1981

[54] POULTRY INSPECTION APPARATUS AND METHOD

[75] Inventor: James B. House, Gainesville, Ga.

[73] Assignee: Stork Gamco, Inc., Gainesville, Ga.

[21] Appl. No.: 99,640

[22] Filed: Dec. 3, 1979

[51] Int. Cl.³ .............................................. A22C 21/00
[52] U.S. Cl. ............................................ 17/45; 17/11
[58] Field of Search ....................... 17/11, 45, 44.1, 24

[56] References Cited

U.S. PATENT DOCUMENTS

| | | | |
|---|---|---|---|
| 2,764,778 | 10/1956 | Long | 17/44.1 |
| 3,156,007 | 10/1964 | Smith | 17/44.1 |
| 3,559,233 | 2/1971 | Bottomley et al. | 17/45 |
| 3,766,602 | 10/1973 | Bottomley | 17/11 |
| 3,902,221 | 9/1975 | Harben, Jr. et al. | 17/11 |
| 4,131,973 | 1/1979 | Verbakel | 17/11 X |
| 4,136,421 | 1/1979 | Scheier et al. | 17/11 X |

Primary Examiner—Willie G. Abercrombie
Attorney, Agent, or Firm—Newton, Hopkins & Ormsby

[57] ABSTRACT

To avoid the passage of contamination from one bird to another at a poultry inspection station in a poultry processing shackle line and to eliminate the necessity for the inspector to touch the birds during the inspection, each bird in succession at the inspection station is automatically engaged and tilted to a breast-up, back-down generally horizontal position with the eviscerated body cavity facing the inspector. In such position, the body cavity is automatically expanded to a wide open condition for easy visual inspection while each bird traverses the inspection station, following which the bird tilting and body cavity expanding units are removed from contact with the birds and thoroughly cleansed near the back of the inspection station prior to automatically engaging other oncoming birds at the inspection station.

17 Claims, 10 Drawing Figures

FIG 1

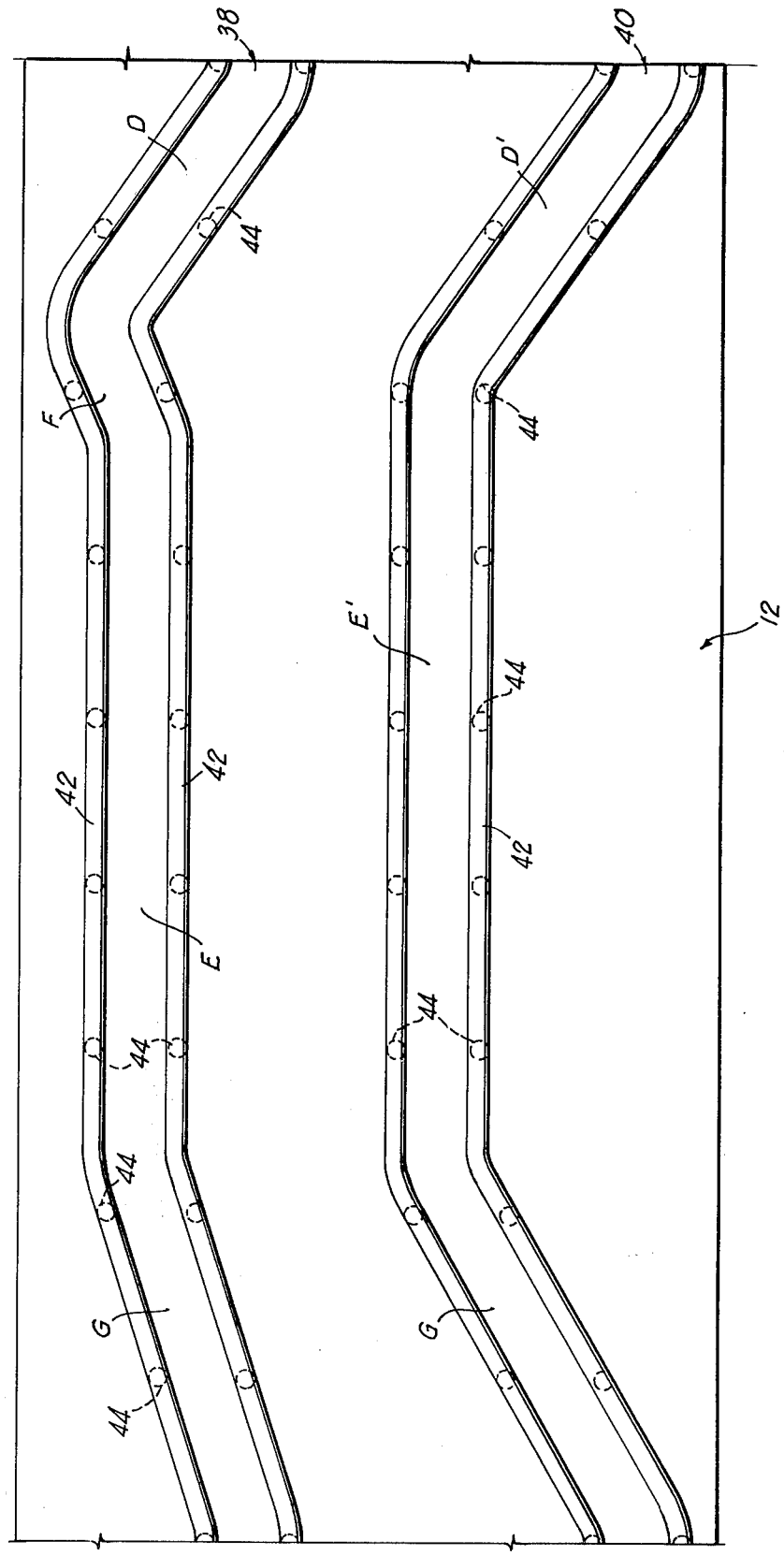

4,283,813

POULTRY INSPECTION APPARATUS AND METHOD

BACKGROUND OF THE INVENTION

The present invention relates to the processing of poultry for human consumption and more particularly to the inspection of poultry by a USDA inspector while the eviscerated poultry is on the processing or shackle line. USDA inspection regulations requiring the checking of each individual bird for disease state that the inspector must have a clear unobstructed view of: (1) the air sac area; (2) sex organ area; and (3) the kidney area.

In the prior art and presently, USDA inspectors have physically oriented the birds and spread the body cavity for visual inspection with their hands. More particularly, in the prior art, the birds being presented for inspection are hung head downwardly by their hocks from shackles with the breast side of the bird facing the inspector at the inspection station. The inspector normally places both hands beneath the breast of each bird to support it while inserting his two thumbs into the body cavity in order to stretch the cavity to a wide open condition so that he can clearly see into the cavity and thus inspect for the presence of any disease or foreign matter. The inspector will also manually tilt each bird to a convenient attitude for visual inspection.

In this manual inspection of poultry where the inspector touches each oncoming bird in turn, not only exteriorly but within the body cavity with his thumbs, there is a great likelihood of directly passing contamination from one bird to the next, and possibly to several birds on down the line as they come before the inspector.

Furthermore, the manual inspection process is tedious, time-consuming and quite tiring to the inspector who must repeatedly grasp and expand the body cavity of each oncoming bird. These drawbacks of the prior art have motivated and given rise to the present invention which has for its main objective to completely eliminate the touching of the conveyed poultry at the inspection station by the hands of the USDA inspector. Instead, in accordance with the invention method and apparatus, each bird in succession is delivered to the inspection station suspended head downwardly on a shackle with the back of the bird, rather than the breast side, facing the inspector. At the inspection station, in a completely automatic sequence requiring no touching of the bird, each bird is engaged and tilted to a roughly horizontal visual inspection position with the eviscerated body cavity facing the inspector for convenient viewing. While in this position, the body cavity is engaged and stretched widely open so that the inspector will have a clear view of the above-enumerated required inspection areas.

Following visual inspection, the bird engaging, tilting and cavity expanding means is automatically separated from contact with the bird and moved into a cleaning zone for thorough cleansing prior to moving into engagement with another oncoming bird at the inspection station. Each visually inspected bird then moves on with its suspension shackle for further conventional processing elsewhere along the shackle line. The inspection process therefore, in essence, is completely automatic both in terms of bird orientation and expanding or opening of the body cavity to allow clear visual inspection without the inspector touching the bird at any time.

Other features and advantages of the invention will become apparent to those skilled in the art during the course of the following detailed description.

BRIEF DESCRIPTION OF THE DRAWINGS

FIG. 1 is a perspective view of inspection station apparatus according to the invention forming a part of a poultry processing shackle line.

FIG. 9 is a fragmentary diagrammatic elevational view in expanded or flat form taken along line 9—9 of FIG. 7.

DETAILED DESCRIPTION

Figure 1:
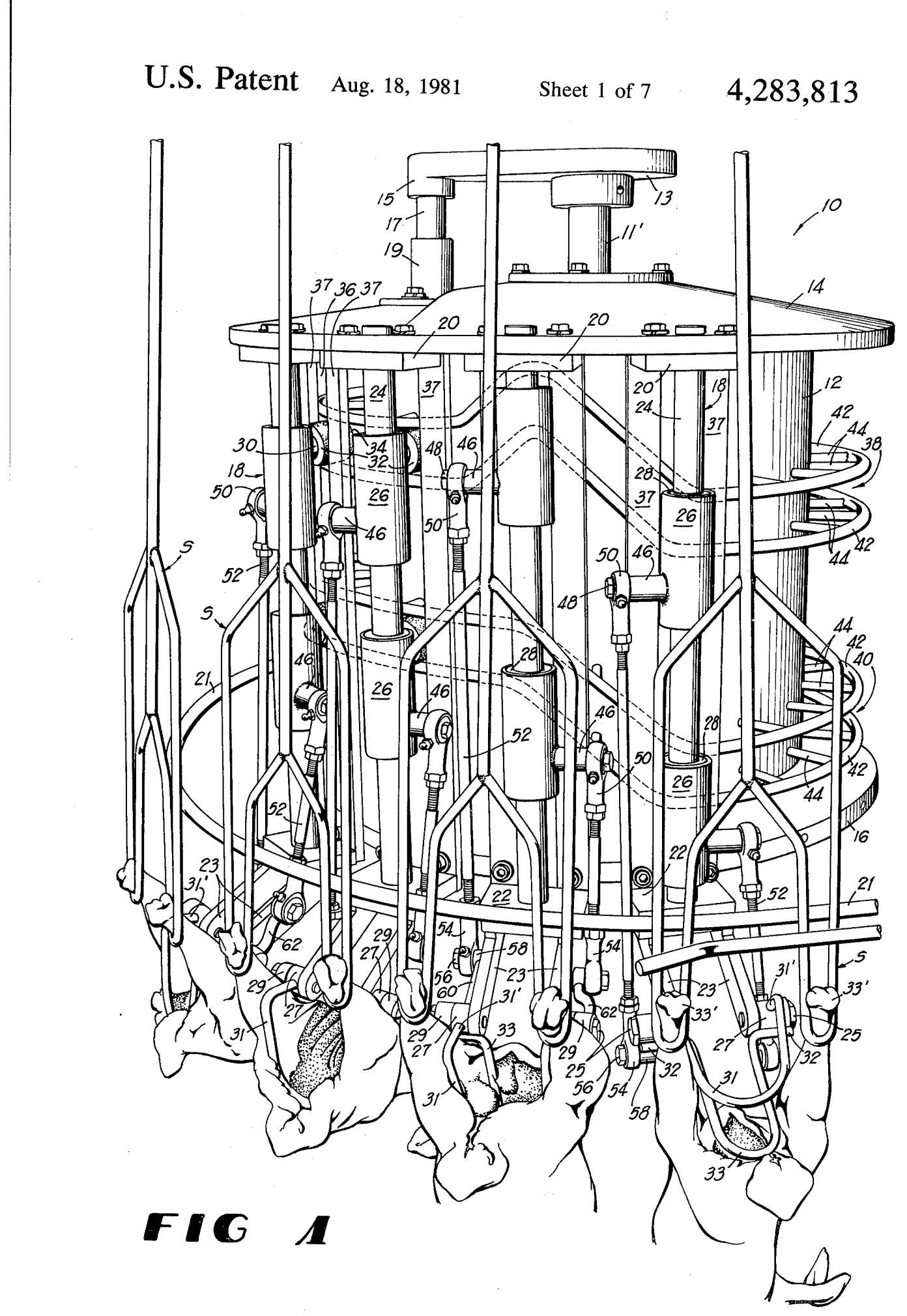
Figure 7:
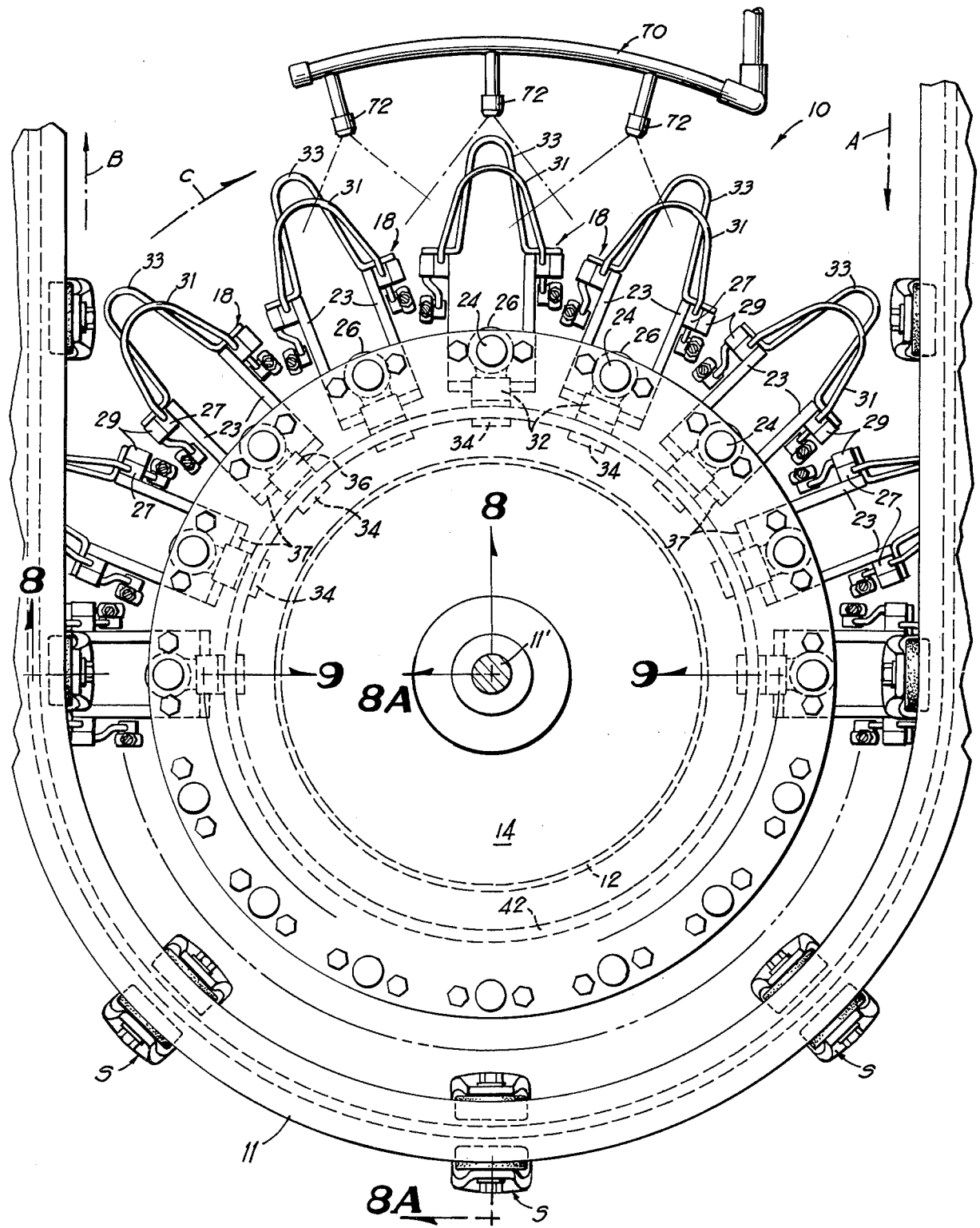
FIG. 7 is a fragmentary plan view, partly in section, of the inspection station apparatus.
Figure 8:
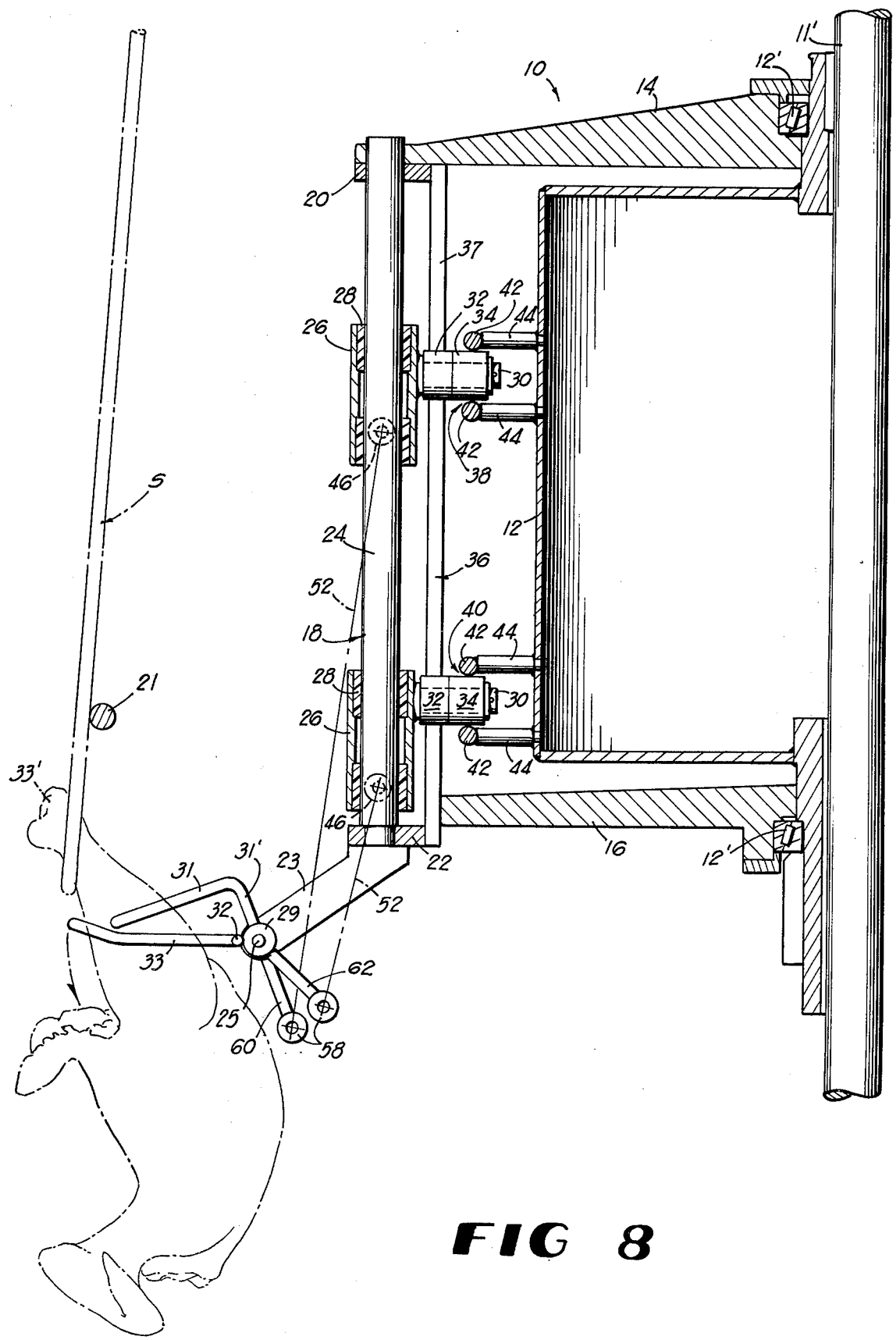
FIG. 8 is a vertical section through the apparatus taken on line 8—8 of FIG. 7.

Referring to the drawings in detail wherein like numerals designate like parts, a poultry inspection station 10 embodying apparatus according to the present invention is shown in FIGS. 1, 7 and 8. The inspection station apparatus is placed at an appropriate location in a conventional poultry processing apparatus or shackle line which includes equidistantly spaced poultry suspension shackles S carried by an overhead shackle conveyor means including a shackle guide rail 11, FIG. 7.

The inspection station apparatus includes coacting stationary and moving components as follows. A stationary cylindrical frame 12 supporting camming parts, yet to be described, is located between superposed upper and lower rotating disc frames 14 and 16 journaled around a vertical axis frame drive shaft 11' through bearings 12', FIG. 8. An eccentric 13, FIG. 1, is fixed on drive shaft 11', which shaft is driven from an overhead shackle sprocket, not shown. The eccentric 13 has a collar 15 which carries a depending drive pin 17 which, when engaged within a sleeve 19 atop frame disc 14, drives the moving components of the inspection station apparatus in synchronism with the shackle conveyor line.

The rotating frame discs 14 and 16 carry vertically extending and circumferentially spaced bird orientation and manipulating mechanisms 18 forming key elements of the invention. Each of these mechanisms 18 is provided with upper and lower mounting plates 20 and 22 attached fixedly to the discs 14 and 16, respectively. Fixed to and depending from each lower mounting plate 22 is a pair of inclined parallel arms 23. A bolt 25 is received transversely through the lower end of each arm 23, and around each such bolt are pivotally journaled coaxial inner collars 27 and outer collars 29. Fixed on the inner pair of collars 27 of each mechanism 18 is a bird body cavity expanding or opening rod element 31 of comparatively wide U-formation having short right angular terminals 31' disposed radially of the collars 27 to which they are fixed.

Similarly, fixed to the outer pairs of collars 29 of each mechanism 18 through welded terminals 32 is a comparatively longer and narrower U-shaped bird orientation or tilting element 33 which underlies the associated cavity opening element 31, as clearly shown in the drawings. The described elements 33 and 31 of each mechanism 18 work in concert with each other to first orient or position each bird in succession at the inspection station in the most advantageous position for visual inspection of its eviscerated body cavity and then to expand such cavity to a wide open state for unobstructed clear viewing by the inspector.

More particularly, with reference to FIGS. 1 through 6 of the drawings, each bird suspended by its hocks 33' from one of the shackles S of the processing apparatus is delivered in turn to the inspection station 10 in the direction of the lead-in arrow A in FIG. 7. The exit, or lead-out, arrow B for the shackles is also shown in FIG. 7 along with rotational directional arrows C for the frames 14 and 16 and associated parts. Upon entering the inspection station 10, each bird is initially suspended head-down with its back facing the USDA inspector who stands at the forward side of the inspection station depicted in FIG. 1. This is in contrast to the usual prior art practice where birds are presented for inspection with the breast facing the inspector, or oppositely from the initial position of each bird for inspection in the present method. The entrance position of each bird is depicted at the right hand side of FIG. 1, in FIG. 2 and also in FIG. 8. At this time, the bird tilting and cavity opening elements of the mechanism 18 are elevated from the body of the bird and generally level, FIG. 8, although these elements have entered between the two legs of the bird. As each bird enters the inspection station and begins to traverse a semi-circular path, FIGS. 1 and 7, the elements 31 and 33 enter between the separated legs of each bird in a manner similar to the meshing of gear teeth to establish the relative position of parts shown in FIG. 2 and at the right hand side of FIG. 1.

Figure 4:
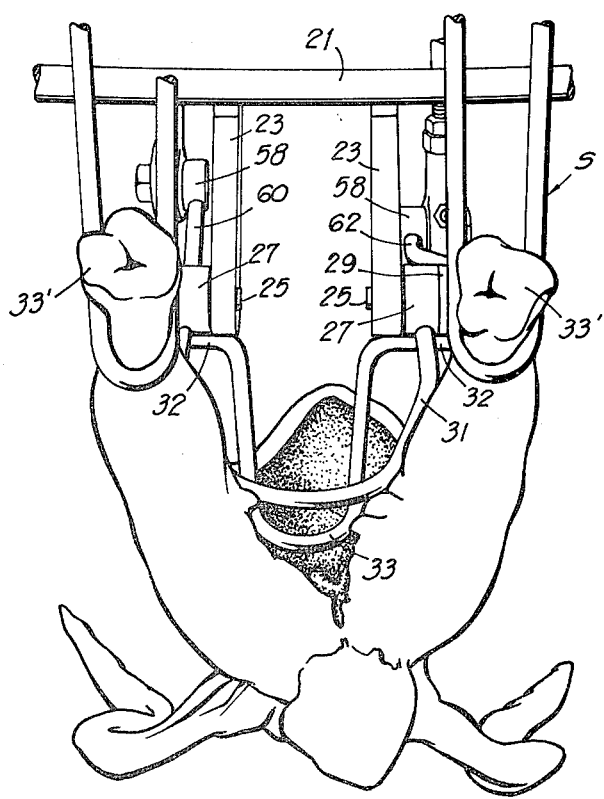
Figure 5:
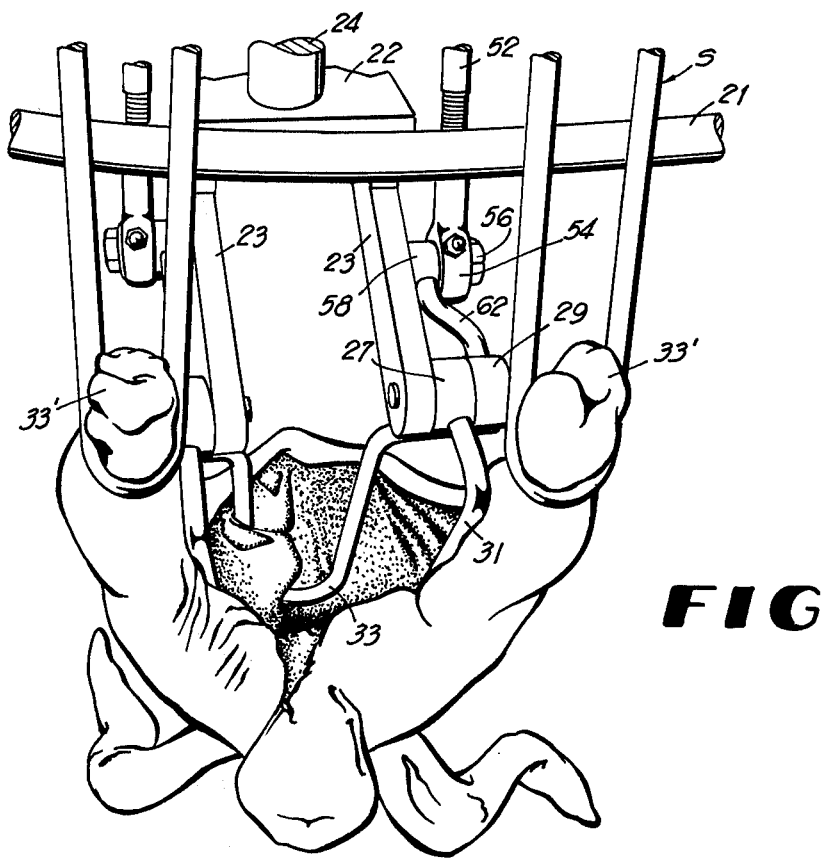
Figure 8A:
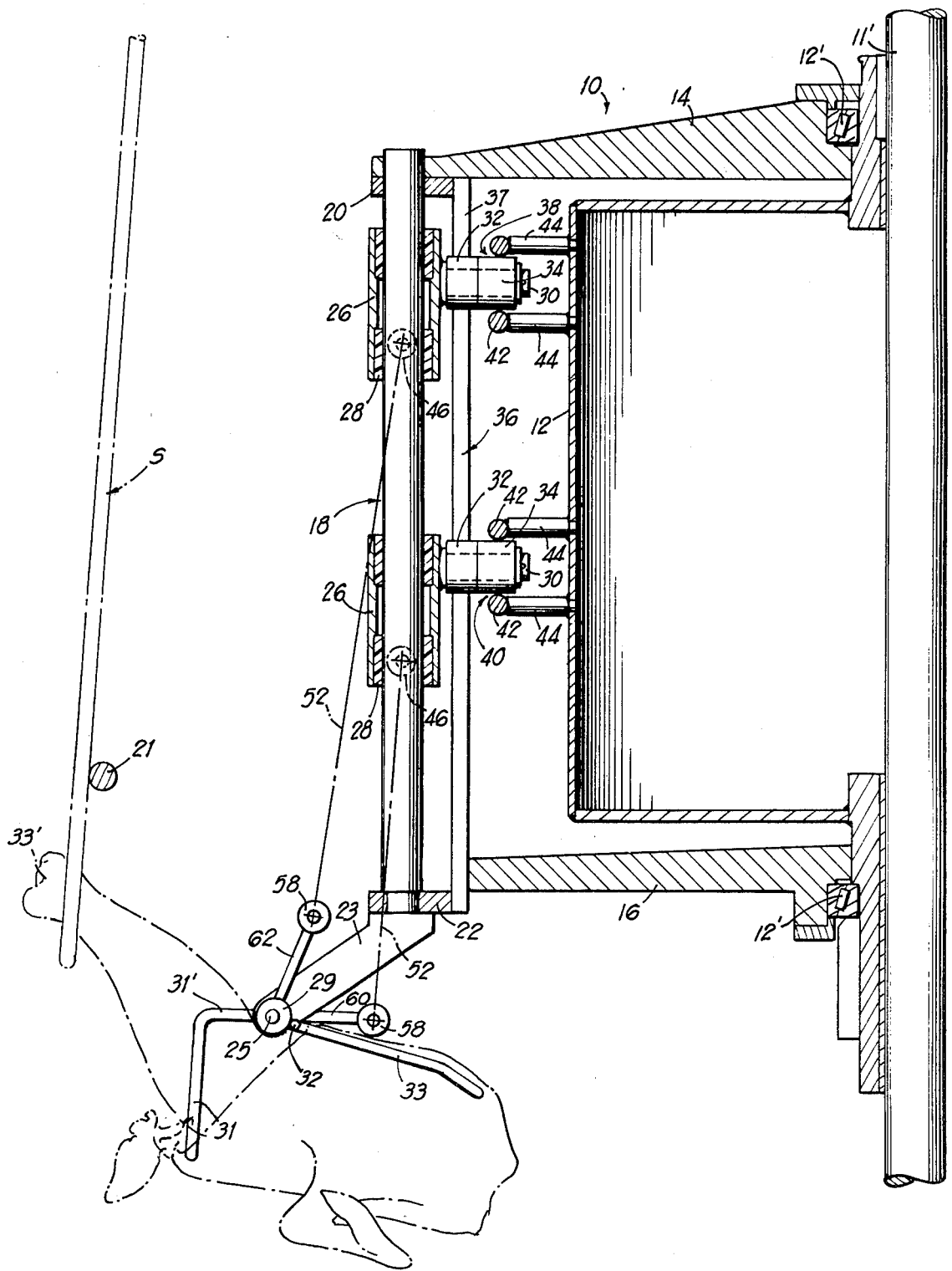
FIG. 8A is an elevational section similar to FIG. 8 taken substantially along lines 8A—8A in FIG. 7.

The birds undergoing inspection move continuously around the inspection station 10 in synchronism with the rotating disc frames 14 and 16. When each moving bird reaches approximately the position shown in FIG. 3, which is the second position from the right in FIG. 1, both the tilting element 33 and opening element 31 will have turned together counterclockwise from the position shown in FIG. 8 and both will have begun to enter the eviscerated body cavity of the bird. Further movement of the bird and of the elements 33 and 31 within the body cavity will cause the longer and narrower bird tilting element 33 to engage the underside of the breast region within the body cavity and to swing or tilt the bird counterclockwise in FIG. 8 on its hocks 33' until the bird assumes a roughly horizontal position, breast up and back down, as shown in FIG. 4 and in FIG. 8A.

Figure 6:
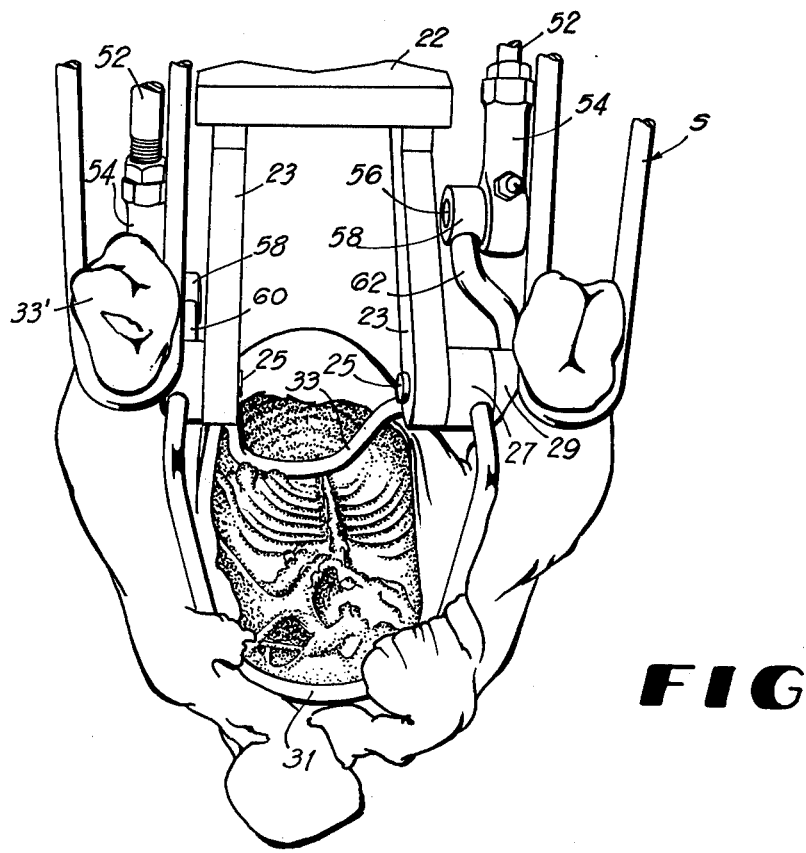

At this time, both of the elements 33 and 31 are projecting inside of the body cavity of the bird. As the process continues and acting in response to the camming means, to be described, the body cavity expanding or opening element 31, namely the shorter and wider U-shaped element, begins reverse or clockwise movement, FIG. 8, while the tilting element 33 remains in the full bird tilting position. This reverse movement of the element 31 causes it to widely open the entrance of the bird body cavity as depicted progressively in FIGS. 5 and 6 and at the left hand side of FIG. 1 while the bird remains in a substantially horizontal position, breast up, with the entrance of the body cavity facing the inspector standing at the front of the inspection station 10. Such inspector will have a clear and unobstructed view of the wide open eviscerated body cavity without the necessity for touching the bird at any time with his hands, to thus achieve the stated objectives of the invention while complying with the enumerated USDA regulations on page 2, above. The clear viewing arrangement is best shown in FIG. 6 of the drawings.

Figure 2:
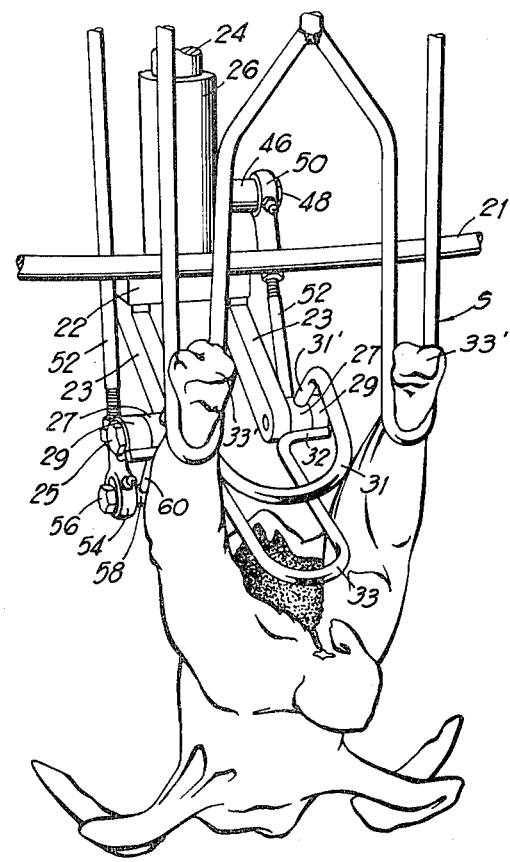
FIGS. 2 through 6 are fragmentary perspective views of apparatus components at the inspection station employed in the practice of the inspection method and illustrating a sequence of method steps.
Figure 3:
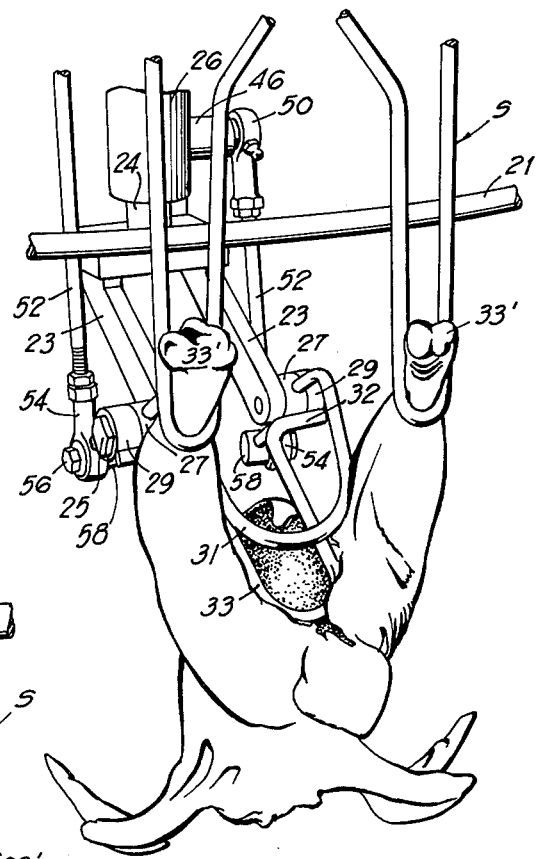

During continued movement of each bird with its shackle S toward the end of the semi-circular path defining the inspection station, the two elements 31 and 33 under influence of their camming means are retracted from the body cavity of the bird and returned to their positions shown in FIGS. 2 and 8 outside of the body cavity. As this occurs, each bird will return automatically to a free-hanging position for further travel along the shackle line in a conventional manner. The above sequence of steps involving the two coacting tilting and cavity opening elements 33 and 31 forms the essence of an improved method of poultry inspection, whereby the inspector is never required to physically touch the birds and the entire operation of orienting each bird and spreading open the bird's body cavity for viewing is entirely automatic and is accomplished by mechanical engaging means. For a complete understanding of the operation of this means embodied in the mechanisms 18, the following additional description of the apparatus is necessary.

Each mechanism 18 further comprises a fixed vertical slide shaft 24 extending between the mounting plates 20 and 22 and rigid therewith. Sleeves 26 containing low friction bushings 28 formed of teflon or the like are slidably mounted on each shaft 24 for vertical displacement. Fixed to each sleeve 26 and extending radially inwardly thereof toward the axis of central drive shaft 11' is a cam follower roller 30 including outer and inner follower roller sections 32 and 34. Each follower roller section 32 engages within a vertical guide slot 36 defined by a pair of fixed spaced parallel vertical guide bars 37 extending between mounting plates 20 and 22, FIG. 8, in each mechanism 18. The guidance of roller sections 32 in the slots 36 restrains the sleeves 26 circumferentially and radially as they revolve with disc frames 14 and 16 around the vertical axis of shaft 11'.

The interior follower roller sections 34 engage rollingly between upper and lower parallel spaced circumferentially extending cam tracks or rods 42 defining between them camming passages 38 and 40 for the roller sections 34 on vertically displaceable sleeves 26. The track elements 42 are anchored by short radial arms 44 to the wall of stationary cylindrical frame 12. The arrangement provides for independent vertical displacement of the upper and lower sleeves 26 of each automatic bird manipulating mechanism 18 of the apparatus.

As shown in FIG. 1, the upper sleeve 26 of each mechanism 18 is equipped with a left-hand pittman linkage while the lower sleeve 26 is equipped with a right side or right-hand pittman linkage. The two linkages for one of the mechanisms 18 are also shown schematically in FIG. 8. More particularly, fixed to each sleeve 26 is a stub shaft 46 which is internally threaded to receive a bolt 48 for rotatably attaching to the stub shaft 46 a ball and socket pittman connector 50. The connector 50 is internally threaded to receive a pittman shaft 52, threaded at both ends for length adjustment. The lower end of each pittman shaft 52 is coupled with a ball and socket connector 54 journaled through an anchor bolt 56 to a collar 58.

As viewed in FIG. 1, the left-hand collar 58 is fixed to a control arm 60 which, at its far end, is rigidly attached to the previously-described collar 27 forming one of a pair of such collars. The right-hand collar 58 journaled with the right-hand pittman connector 54 is secured to a control arm 62 of generally S-formation to allow its rigid attachment to the right-hand outer collar 29 of the previously-described pair of such collars.

During operation, as the upper and lower disc frames 14 and 16 rotate on the axis of shaft 11', they move the attached mechanisms 18 in synchronism with the shackle line, and as previously described, the two coacting elements 33 and 31 synchronously move into engagement between the legs of each oncoming bird at the inspection station 10. As the elements 33 and 31 initially overlie the entrance of the bird body cavity, FIGS. 2 and 8, they are both cammingly rotated into the body cavity by the action of the previously-described cam slots 38 and 40 acting on follower roller sections 34. It should be noted here that a shackle guide rod 21, FIGS. 1 and 8, stabilizes each shackle S and thus maintains each bird in a steady suspended state at the inspection station.

Referring to FIG. 9 of the drawings, as each bird orientation and cavity opening mechanism 18 enters the inspection station 10, from right to left, FIG. 9, the follower roller sections 34 first move upwardly through inclined portions D and D' of the cam slots 38 and 40, thereby producing lowering of the tilting and opening elements 33 and 31 in unison by counterclockwise rotation, FIG. 8, through the action of the described pittman linkages. This action causes both of the elements 33 and 31 to enter the body cavity of the bird which is still facing upwardly. By the time that the follower roller sections 34 reach the top of the inclined cam slot portions D and D', the element 33 has completed the tilting of the particular bird to the roughly horizontal position with breast up and body cavity entrance facing outwardly and slightly upwardly toward the eyes of the inspector. This attitude of the bird is maintained constant through the next 90 degrees of rotation of the mechanism 18 around the axis of shaft 11' by the action of the level portion E' of slot 40 on the lower roller 34. However, the upper roller 34 controlling the cavity opening element 31 is acted on in a different manner before entering a corresponding level section E of cam slot 38. Beginning at the point 38a, FIG. 9, the upper roller 34 is caused to descend for a relatively short distance as at F and this in turn produces reverse or clockwise rotation, FIG. 8, of the element 31 relative to the tilting element 33 to position the wider opening element 31 across the entrance of the eviscerated body cavity, FIGS. 5 and 6, so that the entrance will be stretched widely open for the inspector. This condition is maintained by the element 31 for 90 degrees of rotation of the mechanism 18 along the slot portion E.

After each bird has been visually inspected at the station 10 and near the end of the half-circle inspection station, the two follower roller sections 34 enter downwardly sloping slot portions G and G' of cam slots 38 and 40 which causes corresponding descent of the sleeves 26 on guide shafts 24 and removal of the elements 33 and 31 from the bird body cavity to the original position shown in FIGS. 2 and 8. This action allows each bird to return to its vertical free-hanging position on one of the shackles S so that it can continue its journey along the shackle line to other processing stations, as the case may be. The now elevated elements 33 and 31 separate from between the legs of each bird as the mechanism 18, FIG. 7, begins to pass around to the back side of inspection station 10.

At the back side of station 10, FIG. 7, the bird engaging elements 33 and 31 are thoroughly cleansed with sprays of a solution supplied through a manifold 70 and plural spray nozzles 72. This prevents possible contamination of other oncoming birds which will receive the mechanisms 18 at the inspection station.

The inspection method is thus carried out completely automatically with the assistance of simple and direct acting apparatus components in a continuous repetitive cycle. The inspector has a clear view of the inside of the body cavity and does not touch the birds as they pass in succession before him. This eliminates awkward and tiring handling of the birds by the inspector and prevents passing contamination from one bird to another, as explained. The advantages of the invention over the prior art should be readily apparent to those skilled in the art without the necessity of any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A poultry inspection method comprising continuously moving birds through an inspection station with each bird hanging head downwardly and back forwardly toward an inspector at said station, each bird having an eviscerated body cavity whose entrance faces upwardly at the entrance to the inspection station, mechanically engaging each bird within said body cavity for automatically swinging each bird upwardly until each bird in turn is held in a generally horizontal position breast upwardly and back downwardly with the entrance of the body cavity facing the inspector, and mechanically engaging the entrance portion of said body cavity at the inspection station and expanding it to a wide open condition to provide a clear unobstructed view of the interior of said cavity, including the air sac area, the sex organ area, and the kidney area, and then disengaging each bird near the exit of the inspection station so that each bird will return automatically to a head down hanging position.

2. A poultry inspection method as defined in claim 1, and moving said birds continuously along a predetermined path at said inspection station between the entrance and exit thereof and mechanically engaging each bird between the two legs thereof while each bird is hanging head downwardly and before the entry of engaging means into said body cavity.

3. A poultry inspection method as defined in claim 1, and said mechanical engagement of each bird within said body cavity including positive engagement of the wall of the body cavity underlying the breast of the bird to swing the bird on its hocks to said generally horizontal position and to support the bird in such position during an interval while the interior of the body cavity is undergoing visual inspection.

4. A poultry inspection method as defined in claim 3, and the mechanical engagement of said entrance portion of the body cavity being timed to occur immediately following the swinging of the bird to said horizontal position and continuing during said interval of said visual inspection.

5. A poultry inspection method as defined in claim 4, and said positive engagement of said wall of the body cavity and engagement of said entrance portion being carried out by two relatively movable mechanical engaging elements which can also move substantially in unison.

6. A poultry inspection method as defined in claim 5, and causing said two elements to relatively move and move substantially in unison on arcuate paths around a common rotational axis.

7. A poultry inspection method comprising moving birds in succession at a visual inspection station with each bird hanging by its hocks head downwardly with its back facing forwardly, automatically tilting each bird in succession to a generally horizontal position breast upwardly and with the eviscerated body cavity of the bird facing forwardly, and substantially immediately thereafter automatically widely expanding the entrance of said body cavity to facilitate a clear visual inspection of the interior of such cavity and maintaining each bird tilted and the entrance of said body cavity expanded for a sufficient time interval to allow adequate inspection.

8. A poultry inspection method as defined in claim 7, and said automatic tilting of each bird comprising engaging each bird inside of said body cavity with a moving member, and said expanding of the entrance of said body cavity comprising introducing a wide substantially rigid expanding member into said entrance to stretch it open.

9. A poultry inspection apparatus comprising a stationary frame having stationary camming means thereon, a coacting rotary frame having guided and movable cam follower means thereon defining plural spaced bird engaging mechanisms which move in synchronism with a poultry shackle line carrying plural birds suspended head downwardly from the shackles of said line, and each bird engaging mechanism comprising a first movable engaging element adapted to engage each bird with the eviscerated body cavity thereof to tilt each bird to a generally horizontal breast up position with the entrance of the body cavity facing an inspector, and each bird engaging mechanism comprising a second movable engaging element adapted to move into the entrance of said body cavity to expand it to a wide open condition to promote visual inspection of the interior of said cavity, said first and second engaging elements responding to movements of said cam follower means.

10. A poultry inspection apparatus as defined in claim 9, wherein the first and second movable engaging elements are substantially U-shaped rotary elements having a common rotational axis, and the first engaging element being substantially longer and substantially narrower than the second engaging element.

11. A poultry inspection apparatus as defined in claim 10, and said cam follower means comprising guided follower rollers engaging profiled cam slots of the stationary camming means and additional follower rollers engaging rotary guide track means across the profiled cam slots, and pittman linkages interconnecting said first and second movable engaging elements and parts of the cam follower means which follow said guide track means across said profiled cam slots.

12. A poultry inspection apparatus as defined in claim 11, and said parts comprising independently movable sleeves having positive guided engagement with guide shafts extending across said profiled cam slots.

13. A poultry inspection apparatus as defined in claim 10, and said profiled cam slots comprising a pair of generally parallel slots each having an inclined entrance portion, an intermediate level portion and an inclined exit portion, one of said slots having a second short inclined portion between its inclined entrance portion and its level portion.

14. A poultry inspection apparatus comprising a poultry shackle line and a poultry inspection station in said line including a stationary member having stationary camming means and a coacting movable member having guided cam follower means moving in synchronism with said shackle line, the movable cam follower means comprising plural spaced bird manipulating mechanisms moving in synchronism with individual shackles of said shackle line, and each said mechanism comprising a first movable engaging element adapted to act automatically on each bird along the shackle line to tilt each bird to a generally horizontal breast up inspection position, and each mechanism additionally comprising a second movable engaging element adapted to engage and expand the entrance of the eviscerated body cavity of each bird to facilitate visually inspecting such body cavity at the inspection station.

15. A poultry inspection apparatus as defined in claim 14, wherein said inspection station is arcuate and said coacting movable member is a vertical axis rotary member, and cleansing means for said first and second movable engaging elements near the rear of the inspection station.

16. A poultry inspection apparatus as defined in claim 15, and said cleansing means comprising a cleansing spray header and nozzles for directing cleansing sprays onto said elements during their movement at the rear of said inspection station.

17. A poultry inspection method as defined in claim 5, and the additional step of cleansing said mechanical engaging elements during their movement at the rear of the inspection station.

* * * * *